United States Patent [19]
Dwinell

[11] 4,155,389
[45] May 22, 1979

[54] CABLE TIRE CHAIN WITH IMPROVED TRACTION SLEEVES

[76] Inventor: James M. Dwinell, R.D. 3, Morrisville, Vt. 05661

[21] Appl. No.: 828,905

[22] Filed: Aug. 29, 1977

[51] Int. Cl.² ............................................. B60C 27/06
[52] U.S. Cl. .................................. 152/221; 152/219; 152/243
[58] Field of Search ............... 152/221, 222, 219, 243, 152/225 R, 227-230

[56] References Cited

U.S. PATENT DOCUMENTS

| 3,752,204 | 8/1973 | Ouellette | 152/219 |
| 3,918,505 | 11/1975 | Muller | 152/243 |

FOREIGN PATENT DOCUMENTS

| 1213039 | 3/1960 | France | 152/243 |
| 1444045 | 7/1976 | United Kingdom | 152/243 |

Primary Examiner—L. J. Paperner
Assistant Examiner—Lawrence E. Williams
Attorney, Agent, or Firm—Shapiro and Shapiro

[57] ABSTRACT

A cable tire chain in which traction sleeves of the cross members are of the type in which a sleeve is formed by bending a generally rectangular metal strip into a generally cylindrical shape so that a pair of opposite edges of the strip are opposed in proximity and extend generally longitudinally of the sleeve. The opposed edges meet at a center region of the edges and are spaced elsewhere to provide exposed sharp corners for biting into ice. Each sleeve has a projecting tab at one end only for spacing that sleeve from an adjacent sleeve, the tab and other projections having sharp corners also.

8 Claims, 2 Drawing Figures

CABLE TIRE CHAIN WITH IMPROVED TRACTION SLEEVES

BACKGROUND OF THE INVENTION

This invention relates to tire chains and more particularly to tire chains having cable cross members extending through traction sleeves.

Tire chains are well known in which cross members, and usually the side members also, are formed of cable. As disclosed in U.S. Pat. No. 3,752,204, each cross member may have a series of small metal traction sleeves supported on the cable. Although the cable type tire chain has many advantages, improvement of its traction capability on ice has been desired for some time.

Brief Description of the Invention

It is accordingly a principal object of the present invention to provide an improved tire chain having cable cross members extending through traction sleeves and in particular to provide a tire chain having greater traction capability on ice.

In summary, the improved tire chain of the present invention employs traction sleeves of the type in which a sleeve is formed by bending a generally rectangular strip into a generally cylindrical shape so that a pair of opposite edges of the strip are opposed in proximity and extend generally longitudinally of the sleeve. End regions of the opposed edges are spaced apart to provide exposed sharp corners capable of biting into ice. More specifically, in the preferred form of the invention the opposed edges meet at a central region of the edges and are spaced elsewhere. One end of each sleeve (but not the opposite end) has a projecting tab for spacing that sleeve from an adjacent sleeve, the tab having exposed sharp corners also for biting into ice. The tab spaces each sleeve from an adjacent sleeve to provide a path between the sleeves for ice chips, and since tabs are not provided at both ends of each sleeve, the sleeves will not become locked to adjacent sleeves but instead will rotate with respect to one another in order to maintain the spaces between sleeves free for the passage of ice chips.

BRIEF DESCRIPTION OF THE DRAWINGS

The invention will be further described in conjunction with the accompanying drawing, which illustrates a preferred and exemplary embodiment of the invention, and wherein.

DESCRIPTION OF THE PREFERRED EMBODIMENT

Figure 1:
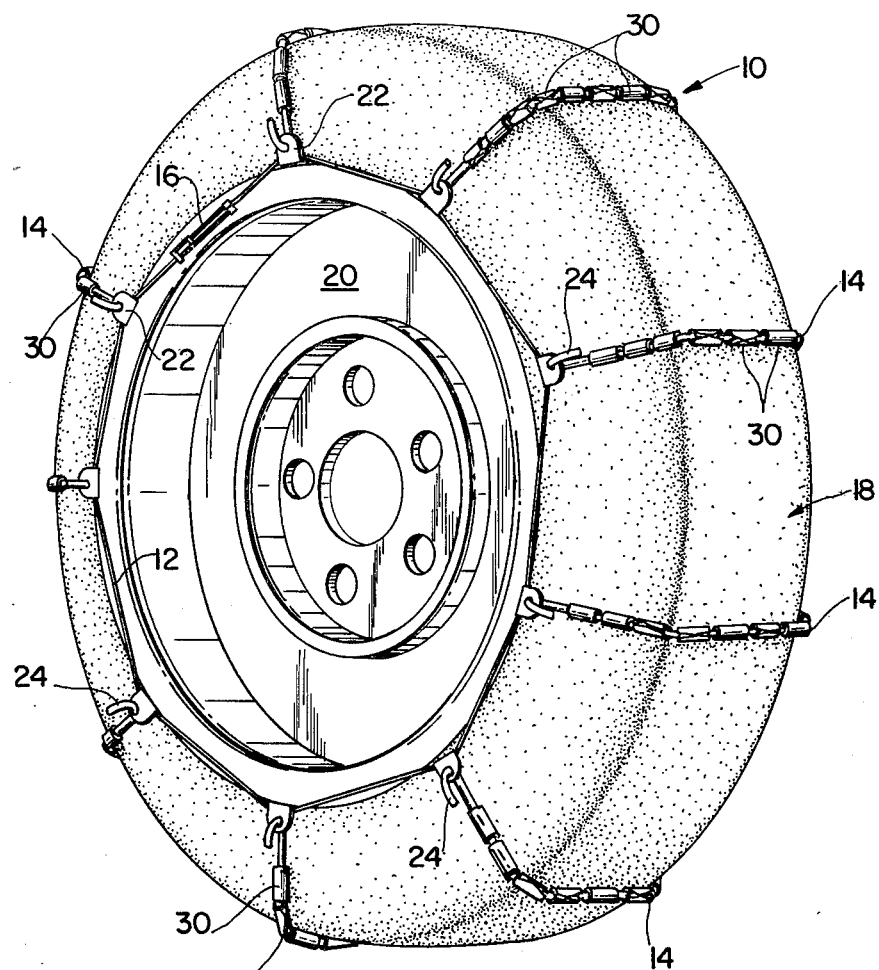
FIG. 1 is a perspective view of a tire chain of the invention shown applied to a vehicle tire.
Figure 2:
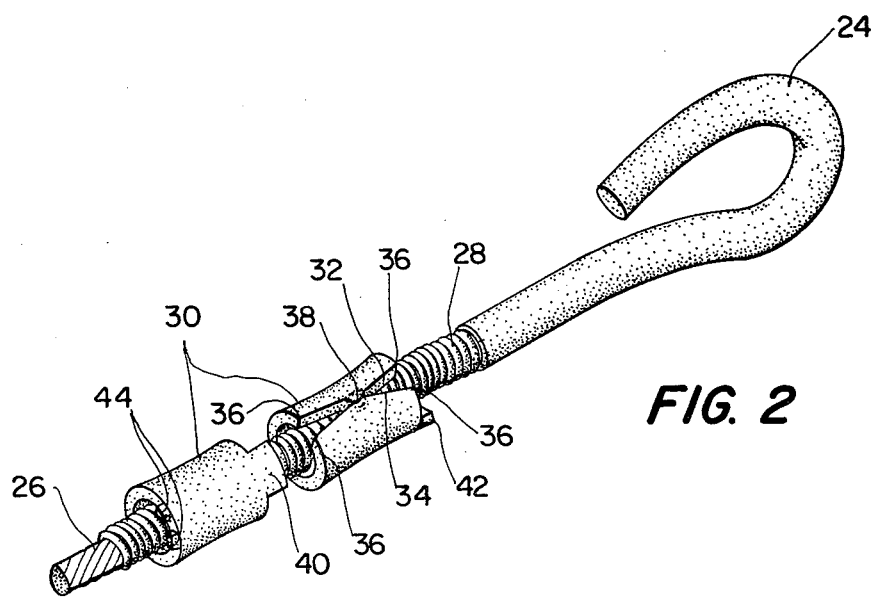
FIG. 2 is an enlarged fragmentary perspective view illustrating details of the novel traction sleeves of the invention.

Referring to the drawings, the present invention is preferably employed in a tire chain 10 of the full cable type, that is, in which the side members 12 as well as the cross members 14 are formed of cable, such as stranded steel aircraft cable. In some instances, however, the side members may be formed of other types of elongated flexible material, such as link chain. Fastener means 16, which may be of the type disclosed in the aforesaid patent, are provided in at least one of the side members to permit the tire chain 10 to be applied to a tire 18 mounted on a vehicle wheel 20.

Spaced anchors 22 fixed to the side members 12, as by crimping, swedging or welding, for example, have holes for receiving corresponding hooks 24 similarly fixed to the opposite ends of each cross member 14. Each cross member, which preferably has a wire 28 helically wound thereon, supports a plurality of sleeves 30.

What has been described so far is known in the prior art. It is also known to form each sleeve from a rectangular strip of metal that is bent to a cylindrical shape, so that a pair of opposite edges of the strip are brought together and extend longitudinally of the sleeve.

In accordance with the present invention, end regions of the opposed edges 32 and 34 are spaced apart to provide exposed sharp corners 36 for biting into ice. Central regions of the opposed edges meet, as shown at 38 to impart some rigidity to the sleeve and to prevent the sleeve from being severely distorted under the loads encountered in use.

Each sleeve is provided with a generally rectangular tab 40 projecting from one end only of the sleeve to space the sleeve from an adjacent sleeve. Each tab has exposed sharp corners 42 also for biting into ice. Since a tab is provided at one end only of each sleeve, the sleeves are asymmetrical and will not readily become locked to adjacent sleeves (by the interlocking of tabs). The sleeves will thus remain free to rotate relative to one another on the supporting cables 26, the inner diameter of each sleeve being substantially larger than the outer diameter of the wire covered cable. The tab-less ends of the sleeves may also have sharp projections, as indicated at 44 to provide additional traction on ice, but these projections should not be so large as to permit the adjacent sleeves to become locked together. By providing fewer sleeves on each cross member than would be required to fill the space between opposite hooks 24, the sleeves are also free to move longitudinally, assisting in the prevention of sleeve lock-up and ensuring paths between the sleeves for passage of ice chips.

By virtue of the invention, many sharp points are provided on the traction sleeves to bite into ice and increase traction on ice, and the sleeves are maintained spaced apart so that ice chips may pass freely between the sleeves to prevent ice buildup between sleeves and to maintain the sharp edges exposed. The longitudinal contours of the sleeves are preferably concave, as shown (the diameter of the sleeves at the center being less than the diameter at the ends). This not only makes it easier for the sharp end edges of the sleeves to bite into ice, but also renders the corners 36 more salient to enhance the traction on ice.

While a preferred embodiment has been shown and described, it will be apparent to those skilled in the art that changes can be made in this embodiment without departing from the principles and spirit of the invention, the scope of which is defined in the appended claims.

The invention claimed is:

1. In a tire chain having cable cross members extending through successive traction sleeves of the type in which a sleeve is formed by bending a generally rectangular metal strip into a generally cylindrical shape so that opposite edges of the strip are opposed in proximity and extend generally longitudinally of the sleeve, the improvement in that said opposed edges have end regions that are spaced apart to provide exposed sharp corners.

2. A tire chain in accordance with claim 1, wherein the opposed edges meet at a central region of the edges and are spaced elsewhere.

3. A tire chain in accordance with claim 2, wherein one end of each sleeve has a projecting tab for spacing that sleeve from an adjacent sleeve.

4. A tire chain in accordance with claim 3, wherein the tabs have exposed sharp corners.

5. A tire chain in accordance with claim 3, wherein each sleeve has a tab at one end only so that the sleeves are asymmetrical.

6. A tire chain in accordance with claim 2, wherein the longitudinal contours of the sleeves are concave.

7. A tire chain in accordance with claim 1, wherein the end edges of the sleeves have sharp projections.

8. A tire chain in accordance with claim 1, wherein said sleeves are free to turn about the cable cross members and to move along the cable cross members.

* * * * *